US 9,952,344 B2

United States Patent
Chang et al.

(10) Patent No.: US 9,952,344 B2
(45) Date of Patent: Apr. 24, 2018

(54) HIGH-PERFORMANCE DIPOLE ACOUSTIC TRANSMITTER

(71) Applicant: HALLIBURTON ENERGY SERVICES, INC., Houston, TX (US)

(72) Inventors: Chung Chang, Houston, TX (US); Tianrun Chen, Sugar Land, TX (US); Gary Kainer, Tomball, TX (US); Haoshi Song, Sugar Land, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 146 days.

(21) Appl. No.: 15/115,636

(22) PCT Filed: Feb. 27, 2014

(86) PCT No.: PCT/US2014/019139
§ 371 (c)(1),
(2) Date: Jul. 29, 2016

(87) PCT Pub. No.: WO2015/130296
PCT Pub. Date: Sep. 3, 2015

(65) Prior Publication Data
US 2017/0168186 A1 Jun. 15, 2017

(51) Int. Cl.
*G01V 1/52* (2006.01)
*G01V 1/46* (2006.01)
*G01V 1/145* (2006.01)

(52) U.S. Cl.
CPC .................. *G01V 1/52* (2013.01); *G01V 1/46* (2013.01); *G01V 1/145* (2013.01); *G01V 2200/16* (2013.01)

(58) Field of Classification Search
CPC ........... G01V 1/52; G01V 1/143; G01V 1/145
(Continued)

(56) References Cited

U.S. PATENT DOCUMENTS 4,207,961 A    6/1980   Kitsunezaki
4,383,591 A    5/1983   Ogura
(Continued)

FOREIGN PATENT DOCUMENTS

EP       0263148       4/1988
WO    2013/187875    12/2013
WO    2015/130296     9/2015

OTHER PUBLICATIONS

PCT International Search Report and Written Opinion, dated Nov. 20, 2014, Appl No. PCT/US2014/019139, "A High-Performance Dipole Acoustic Transmitter," Filed Feb. 24, 2014, 11 pgs.
(Continued)

*Primary Examiner* — Ian J Lobo
(74) *Attorney, Agent, or Firm* — Benjamin Fite; Parker Justiss, P.C.

(57) ABSTRACT

A disclosed high-purity dipole transmitter has a longitudinal axis, an oscillation axis, and a side axis, each of the axes being mutually orthogonal. The transmitter includes an outer shell having external surfaces for displacing fluid along the oscillation axis. The transmitter also includes a reaction mass positioned inside the outer shell. The transmitter also includes an electromagnetic actuator that drives the outer shell relative to the reaction mass. The transmitter also includes a pair of matching springs separated along the longitudinal axis, where each spring is coupled between the outer shell and the reaction mass to enable compliant dipole motion of the outer shell along the oscillation axis while suppressing motion along other axes. Each spring includes a beam arrangement with each beam extending lengthwise in a direction parallel to the side axis and being thinnest in a direction parallel to the oscillation axis. The outer shell, the reaction mass, the electromagnetic actuator, and each spring, have mirror symmetry in a plane that includes the oscillation
(Continued)

axis and the longitudinal axis, and have mirror symmetry in a plane that includes the side axis and the longitudinal axis.

32 Claims, 13 Drawing Sheets

(58) Field of Classification Search
USPC .......................... 367/25; 181/102, 104, 106
See application file for complete search history.

(56) References Cited

U.S. PATENT DOCUMENTS

| | | | |
|---|---|---|---|
| 4,862,991 A | | 9/1989 | Hoyle et al. |
| 5,181,576 A | | 1/1993 | Askew |
| 5,229,554 A | | 7/1993 | Cole |
| 5,266,854 A | | 11/1993 | Murray |
| 5,357,481 A | | 10/1994 | Lester et al. |
| 5,477,101 A | * | 12/1995 | Ounadjela ............... G01V 1/145 310/328 |
| 5,852,262 A | | 12/1998 | Gill et al. |
| 6,474,439 B1 | | 11/2002 | Hoyle et al. |
| 6,661,737 B2 | | 12/2003 | Wisniewski et al. |
| 8,511,421 B1 | * | 8/2013 | Sugiyama ............... G01V 1/159 181/106 |
| 2004/0257912 A1 | | 12/2004 | Dubinsky et al. |

OTHER PUBLICATIONS

Morris, C.F. et al., "A New Sonic Array Tool for Full Waveform Logging," SPE 13285, 59th Annual Technical Conference and Exhibition, Society of Petroleum Engineers of AIME, Sep. 16-19, 1984, 8 pgs.

Kurkijan, A.L. et al., "Slowness Estimation from Sonic Logging Waveforms," Geoexploration, 27, Elsevier Science Publishers B.V., Amsterdam, (1991), p. 215-256.

Kimball, Christopher V. et al., "Semblance Processing of Borehole Acoustic Array Data," Geophysics, vol. 49, No. 3, (Mar. 1984), (1984), p. 274-281.

Harrison, A.R. et al., "Acquisition and Analysis of Sonic Waveforms from a Borehole Monopole and Dipole Source for the Determination of Compressional and Shear Speeds and Their Reaction to Rock Mechanical Properties and Surface Seismic Data," SPE 20557, 65th Annual Technical Conference and Exhibition of the Society of Petroleum Engineers, Sep. 23-26, 1990, pp. 267-282.

* cited by examiner

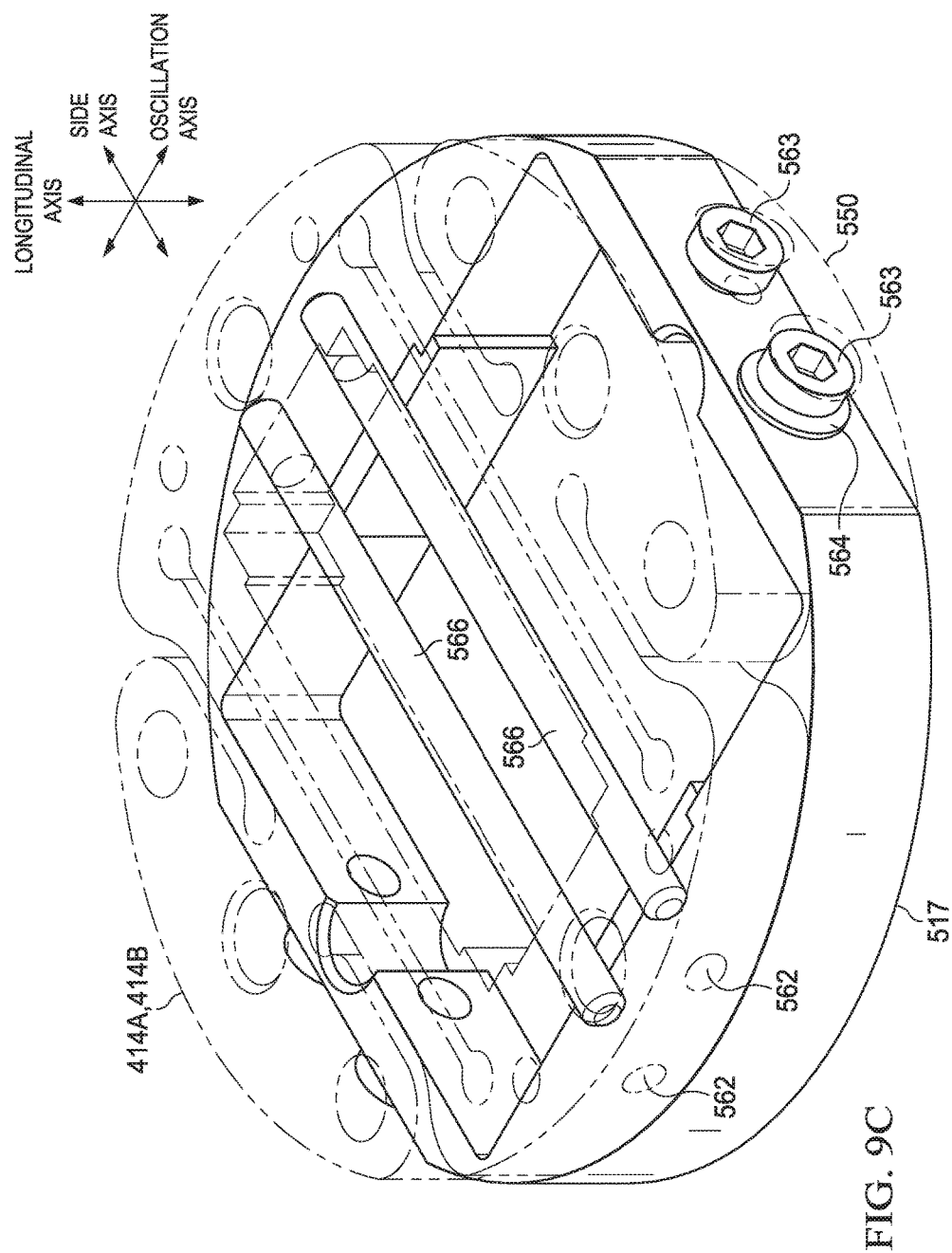

US 9,952,344 B2

HIGH-PERFORMANCE DIPOLE ACOUSTIC TRANSMITTER

BACKGROUND

Acoustic well logging is a well-developed art. Details of some existing acoustic logging tools and techniques are set forth in A. Kurkjian, et al., "Slowness Estimation from Sonic Logging Waveforms", Geoexploration, Vol. 277, pp. 215-256 (1991); C. F. Morris et al, "A New Sonic Array Tool for Full Waveform Logging," SPE-13285, Society of Petroleum Engineers (1984); A. R. Harrison et al., "Acquisition and Analysis of Sonic Waveforms From a Borehole Monopole and Dipole Source . . . " SPE 20557, pp. 267-282 (September 1990); and C. V. Kimball and T. L. Marzetta. "Semblance Processing of Borehole Acoustic Array Data", Geophysics, Vol. 49, pp. 274-281 (March 1984). An example of an acoustic logging tool is provided in U.S. Pat. No. 6,661,737.

To summarize, acoustic logging tools typically include an acoustic source (transmitter), and a set of receivers that are spaced several inches or feet apart. An acoustic signal is transmitted by the acoustic source and received at the receivers of the borehole tool which are spaced apart from the acoustic source. Measurements are repeated every few inches as the tool descends or ascends in the borehole. The acoustic signal from the source travels through the formation adjacent the borehole to the receiver array, and the arrival times and perhaps other characteristics of the receiver responses are recorded.

Several different types of dipole acoustic transmitters have been used in acoustic logging tools. Some dipole acoustic transmitters are actuated using piezoelectric forces, while others are actuated using electromagnetic forces. Piezoelectric-based acoustic transmitters suffer high electrical impedance at low frequencies and are unable to deliver large pulse pressures at low frequency. Further, the displacement needed for low frequencies can damage the piezoelectric materials. While electromagnetic-based acoustic transmitters can overcome high electrical impedance physics at low frequency, it is not a trivial task to design a dipole acoustic transmitter that can deliver efficient, high-purity dipole performance over a range of frequencies.

BRIEF DESCRIPTION OF THE DRAWINGS

Accordingly, there are disclosed herein high-purity dipole acoustic transmitter embodiments and related logging tools and methods. In the drawings:

FIG. 9A-9C are views of a spring for the illustrative dipole acoustic transmitter embodiment.

Figure 1:
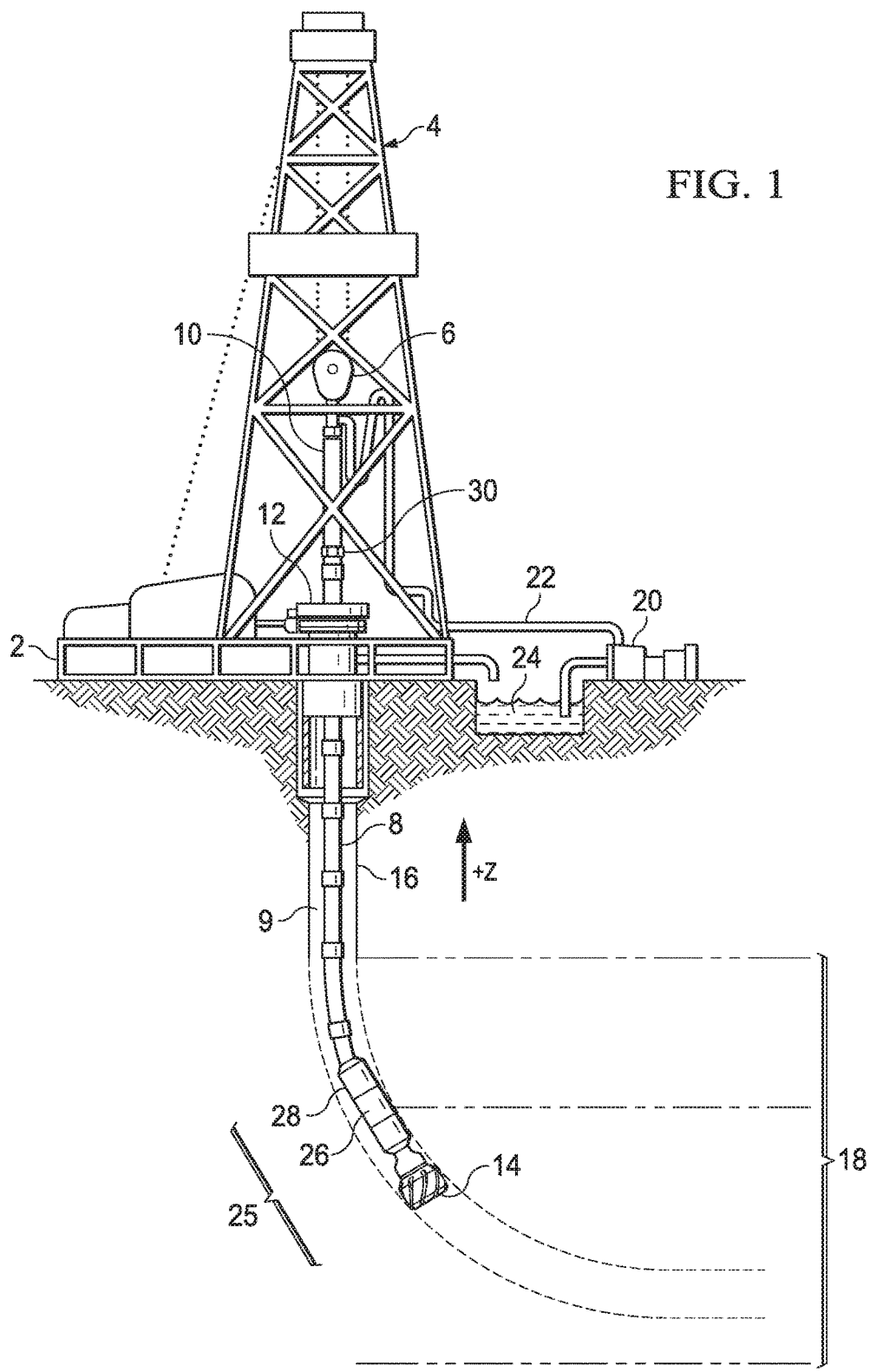
FIG. 1 shows an illustrative logging-while-drilling (LWD) tool survey environment.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

Disclosed herein are high-purity dipole acoustic transmitter embodiments and related logging tools and methods. The disclosed high-purity dipole acoustic transmitter embodiments can be appreciated in the context of logging-while-drilling (LWD) survey environments, wireline logging survey environments, reverse vertical seismic profiling (RVSP) survey environments, and/or cross-well survey environments. FIG. 1 shows an illustrative LWD survey environment. In FIG. 1, a drilling platform 2 supports a derrick 4 having a traveling block 6 for raising and lowering a drill string 8. A drill string kelly 10 supports the rest of the drill string 8 as it is lowered through a rotary table 12. The rotary table 12 rotates the drill string 8, thereby turning a drill bit 14. As bit 14 rotates, it creates a borehole 16 that passes through various formations 18. A pump 20 circulates drilling fluid through a feed pipe 22 to kelly 10, downhole through the interior of drill string 8, through orifices in drill bit 14, back to the surface via the annulus 9 around drill string 8, and into a retention pit 24. The drilling fluid transports cuttings from the borehole 16 into the pit 24 and aids in maintaining the integrity of the borehole 16.

The drill bit 14 is just one piece of an open-hole LWD assembly that includes one or more drill collars 26 and logging tool 28. Drill collars 26 are thick-walled steel pipe sections that provide weight and rigidity for the drilling process. The logging tool 28 (which may be built into the drill collars) gathers measurements of various drilling or formation parameters. Without limitation, logging tool 28 may be integrated into the bottom-hole assembly 25 near the bit 14 to collect measurements. The collected measurements may be plotted and used for steering the drill string 8 and/or to analyze formation properties. In accordance with at least some embodiments, the logging tool 28 corresponds to an acoustic logging tool with one or more high-purity acoustic transmitters as described herein.

Measurements from the logging tool 28 can be acquired by a telemetry sub (e.g., integrated with logging tool 28) to be stored in internal memory and/or communicated to the surface via a communications link. Mud pulse telemetry is one common technique for providing a communications link for transferring logging measurements to a surface receiver 30 and for receiving commands from the surface, but other telemetry techniques can also be used. In accordance with at least some embodiments, measurements collected from the logging tool 28 are processed by a computer system to produce one or more well logs for analysis by a user. The contemplated logs include acoustic logging measurements such as the propagation velocities of compressional and shear waves, the received waveforms, and derivable values such as acoustic impedance.

At various times during the drilling process, the drill string 8 shown in FIG. 1 may be removed from the borehole 16. Once the drill string 8 has been removed, as shown in the wireline logging survey environment of FIG. 2A, logging operations can be conducted using a wireline logging string 34 (i.e., an assembly of wireline logging tools suspended in borehole 16 by a cable 42 having conductors for transporting power to the tools and telemetry from the tools to the surface). It should be noted that various types of formation property sensors can be included with the wireline logging string 34. As shown, the illustrative wireline logging string 34 includes logging tool 28, which may collect acoustic logging data as described herein. The logging tool 28 may be coupled to other modules of the wireline logging string 34 by one or more adaptors 33.

Figure 2A:
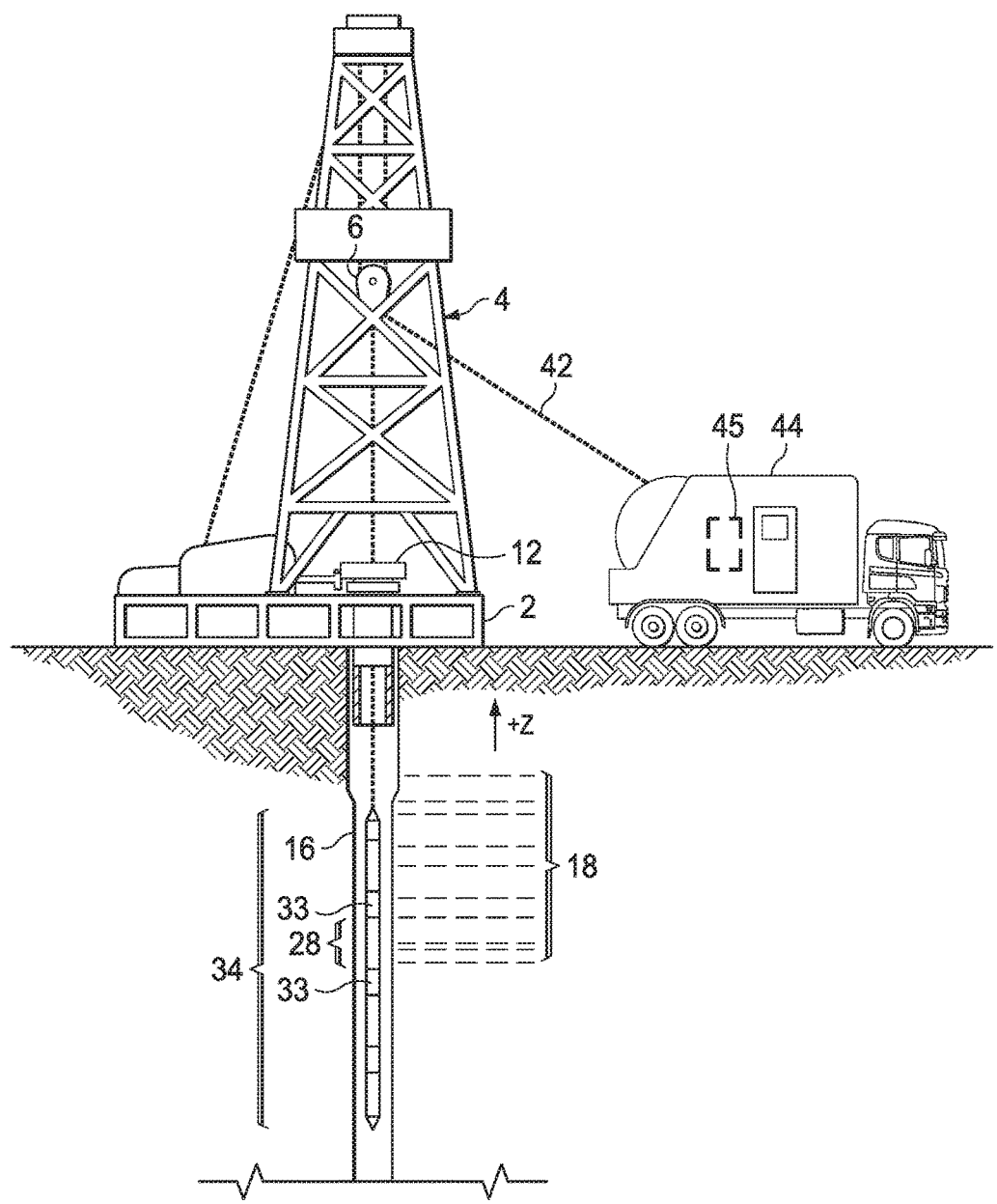
FIG. 2A shows an illustrative wireline tool survey environment.

In FIG. 2A, a wireline logging facility 44 collects measurements from the logging tool 28, and includes computing facilities 45 for managing logging operations, acquiring and storing the measurements gathered by the wireline logging string 34, and processing the measurements for display to an operator.

Figure 2B:
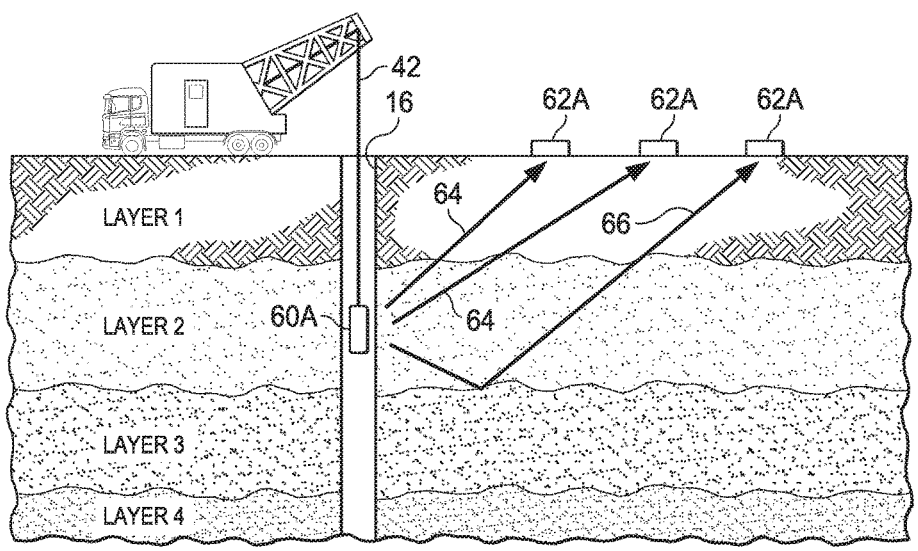
FIGS. 2B and 2C show other illustrative survey environments.

FIG. 2B shows an RVSP survey environment, in which an acoustic source 60A is positioned downhole and acoustic receivers 62A are positioned at or near earth's surface. The acoustic receivers 62A collect direct arrival signals 64 and/or reflected arrival signals 66 in response to one or shots triggered by the acoustic source 60A. As an example, the acoustic source 60A may be positioned in a borehole 16 via a wireline 42, where the vertical position of the acoustic source 60A may be lowered or raised to collect direct arrival signals 64 and/or reflected arrival signals 66 corresponding to different shot offsets. The traveltimes of the direct arrival signals 64 and/or the reflected arrival signals 66 can be inverted to determine properties of formation layers (e.g., layers 1-4), boundary locations, and/or downhole parameters. In alternative embodiments, the acoustic source 60A may be lowered or raised in a borehole 16 during drilling (e.g., LWD) operations, casing operations, cementing operations, and/or pump down operations. In some embodiments, the acoustic source 60A is positioned downhole as part of a permanent well installation.

When a high-purity dipole transmitter is used for the acoustic source 60A in an RVSP survey environment (e.g., the environment of FIG. 2B), strong and repeatable low frequency signals are generated while avoiding strong monopole Stonely waves. Further, the position of the acoustic source 60A can be adjusted as needed and many shots fired to generate a large measurement aperture. In such case, an efficient implement is to fix the position of the acoustic receivers 62A and adjust/track the position of the downhole acoustic source 60A.

Figure 2C:
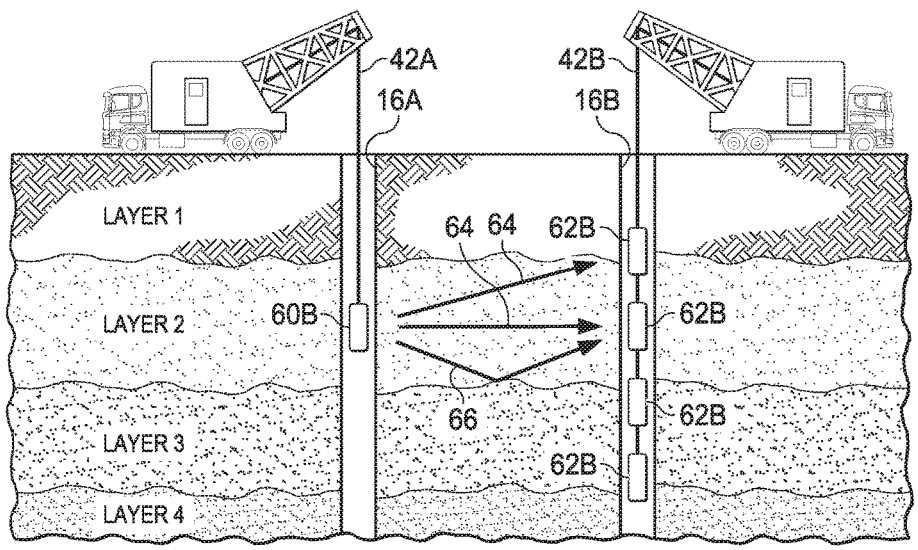

FIG. 2C shows a cross-well survey environment, in which both acoustic source 60B and acoustic receivers 62B are positioned downhole. Again, the acoustic receivers 62B collect direct arrival signals 64 and/or reflected arrival signals 66 in response to one or shots triggered by the acoustic source 60B. As an example, the acoustic source 60B and acoustic receivers 62B may be positioned respectively in borehole 16A and 16B via wirelines 42A and 42B. The vertical position of the acoustic source 60B and/or the acoustic receivers 62B may be lowered or raised to collect direct arrival signals 64 and/or reflected arrival signals 66 corresponding to different shot offsets. The traveltimes of the direct arrival signals 64 and/or the reflected arrival signals 66 can be inverted to determine properties of formation layers (e.g., layers 1-4), boundary locations, and/or other downhole parameters. In alternative embodiments, the acoustic source 60B and/or the acoustic receivers 62B in the cross-well configuration of FIG. 2C may be lowered or raised in respective boreholes 16A, 16B during drilling operations, casing operations, cementing operations, and/or pump down operations. In some embodiments, the acoustic source 60B and/or the acoustic receivers 62B are positioned downhole as part of permanent well installations.

Figure 3:
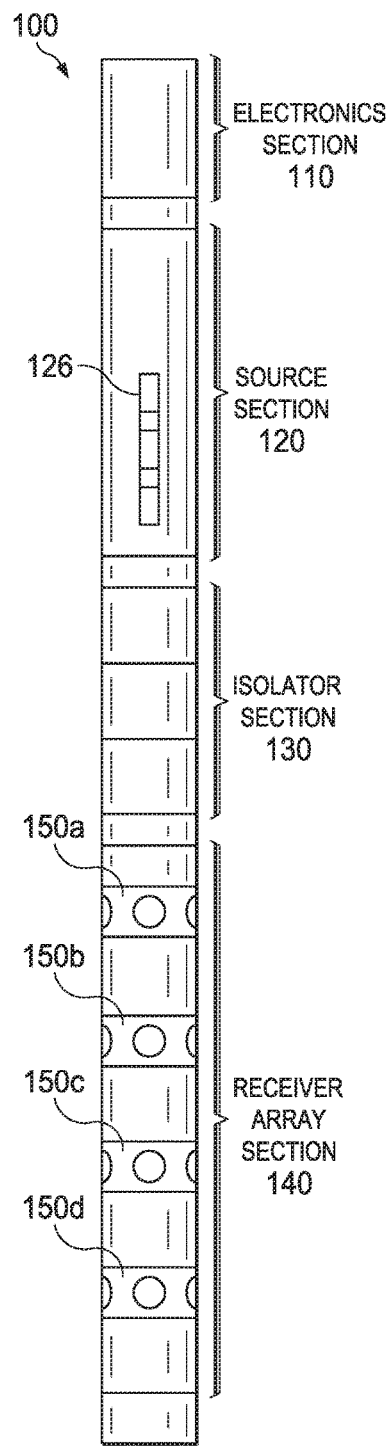
FIG. 3 shows an illustrative acoustic logging tool.

When a high-purity dipole transmitter is used for the acoustic source 60B in an cross-well survey environment (e.g., the environment of FIG. 2B), strong and repeatable low frequency signals are generated while avoiding strong monopole Stonely waves in the same well. Such Stoneley waves tend to complicate cross-well survey measurements and the inversion process. Further, the small footprint of the disclosed high-purity dipole transmitter facilitates its deployment in an array to reduce the acquisition time for cross-well surveys. FIG. 3 shows a block diagram of an illustrative acoustic logging tool 100. The acoustic logging tool 100 may correspond to, for example, logging tool 28 of FIGS. 1 and 2. As shown, the acoustic logging tool 100 includes electronics section 110, a source section 120, an isolator section 130, and a receiver array section 140.

The electronics section 110 may include various components to control acoustic source output provided by source section 120, to process signals collected by the receiver array section 140, and to communicate with other downhole tools and/or with a surface computer. Example components of electronics section 110 include digital signal processors, microcontrollers, memories, analog-to-digital converters, digital-to-analog converters, modems, and power amplifiers.

In at least some embodiments, the electronics section 110 directs operations of the acoustic logging tool 100 by controlling the triggering and timing of one or more dipole acoustic transmitters 126 in source section 120. As an example, a controller in the electronics section 110 may fire a dipole acoustic transmitter 126 periodically, thereby producing acoustic pressure waves that propagate through fluid in the borehole 16 and into the surrounding formation 18. At the borehole boundary, some of the acoustic energy is converted into compressional waves that travel through the formation, and into shear waves that propagate along the interface between fluid in the borehole 16 and the formation 18. As these waves propagate past the receiver array section 140, they cause pressure variations that can be detected by individual receiver array elements. The signals collected by the receiver array section 140 can be processed downhole and/or at the surface to determine formation characteristics.

In at least some embodiments, the source section 120 includes multiple dipole acoustic sources 126 that are longitudinally mounted in tool 100 with different azimuthal orientations (e.g., a 90 degree offset) to deliver acoustic energy in different directions. One or more of the dipole acoustic transmitters 126 in the source section 120 correspond to a high-purity dipole transmitter as described herein. Such high-purity dipole transmitters may be driven with any type of pulsed carrier frequency ranging from 300 Hz to 10 kHz. Further, a broadband pulse shaped to produce a flat response over the entire frequency range of a high-purity dipole transmitter may be used. Example pulses include short minimum phase wavelets and chirps. The output pressure of high-purity dipole acoustic transmitters included in source section 120 vary based on the amount of power supplied and are limited by gap size (the spacing between an action mass components and reaction mass components) and magnetic circuit saturation.

Figure 4:
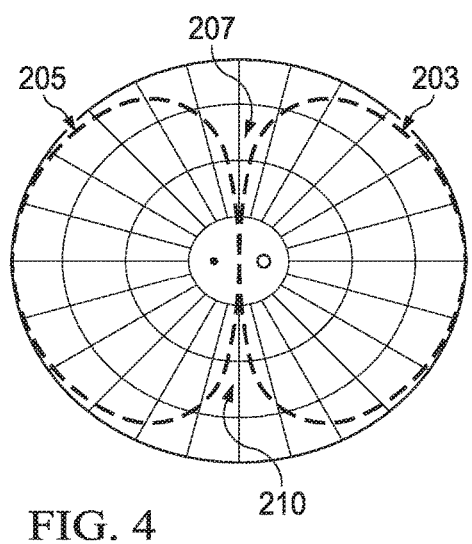
FIG. 4 shows an illustrative an acoustic signal pattern generated by a dipole transmitter.

FIG. 4 shows an illustrative dipole radiation pattern suitable for measuring shear wave propagation velocity along the borehole walls. The dipole pattern may be regarded as equivalent to two monopole sources of equal strength but opposite phase and separated by a small distance compared with the wavelength of sound. Thus, while one monopole source expands, the other monopole source contracts. A dipole source does not radiate sound equally in all directions. As shown, the dipole pattern includes two regions ("lobes") 203 and 205 where sound is radiated very well, and two regions ("nulls") 207 and 210 where sound cancels.

Figure 5:
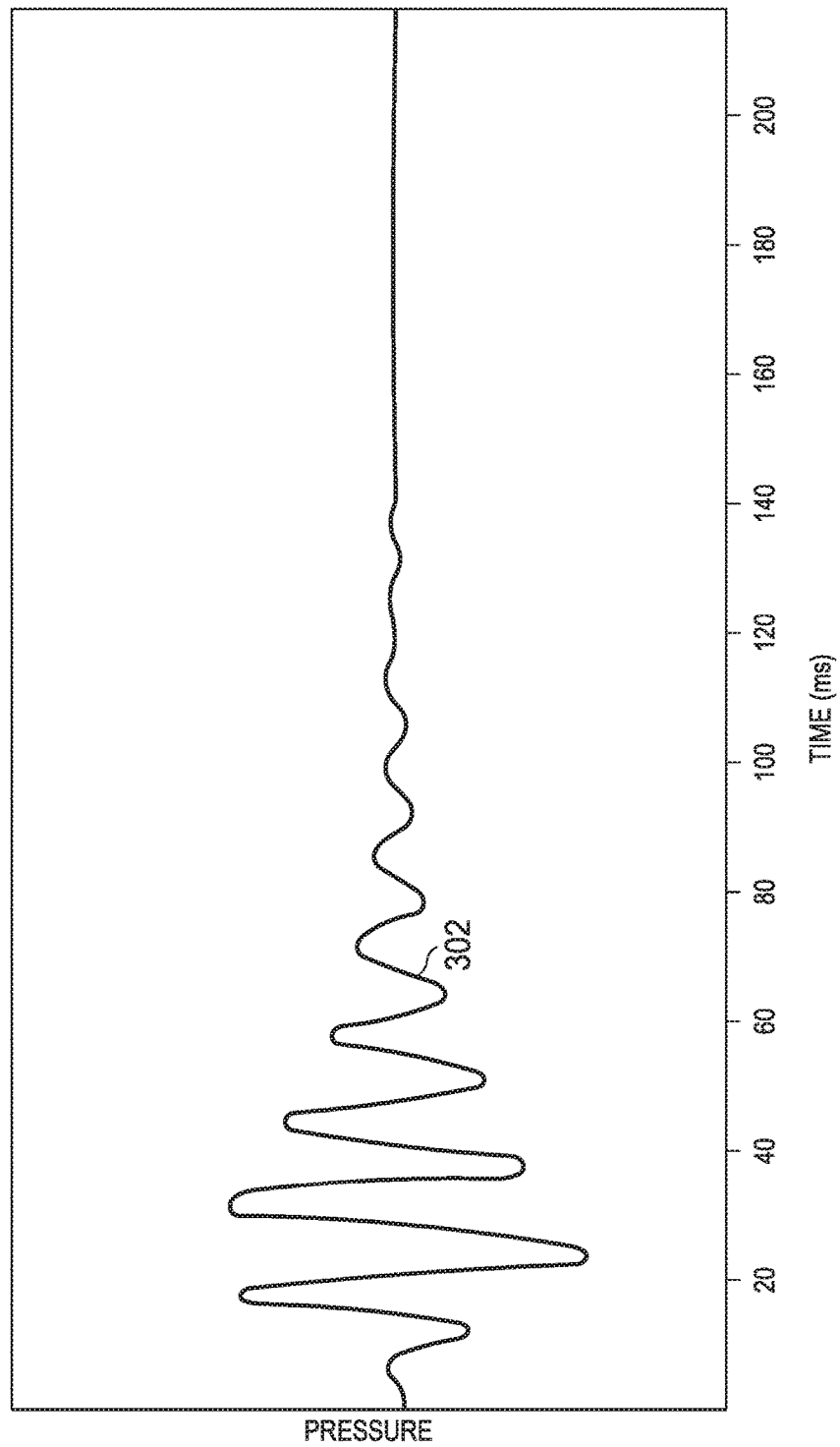
FIG. 5 is a graph of an illustrated pressure signal generated by a dipole acoustic transmitter in response to a drive pulse.

FIG. 5 is a graph 300 of a pressure signal generated, in response to a drive pulse, by a high-purity dipole acoustic transmitter embodiment disclosed further below. As shown, the amplitude of pressure signal 302's oscillations exhibits a rapid increase followed by an exponential decay. In accordance with at least some embodiments, the maximum pressure applied in each direction may be around 200 to 300 pascals and the pressure curve 302 decays within a few milliseconds of the drive pulse. In different embodiments, the decay of pressure signal 302 may be varied by adjusting the amount of damping applied to dipole acoustic transmitter springs.

Returning to FIG. 3, isolator section 130 contains an acoustic isolation component that serves to attenuate and delay acoustic waves that propagate through the body of the tool from the source section 120 to the receiver array 140, so that the formation response can be measured before the arrival of the body waves. In addition to isolator section 130, additional acoustic wave isolators/absorbers (not shown) may be used in the receiver array section 140 (e.g., at the ends and between successive receiver sets). The individual mountings of the acoustic transmitters and receivers may provide further isolation.

In at least some embodiments, the receiver array section 140 includes receiver sensors (e.g., piezoelectric crystals) arranged in four co-planar rings 150a-150d. Each ring may have four receivers mounted perpendicular to the tool axis and evenly distributed at 90 degrees from each other. The circumferential positions of the receivers may be aligned with the dipole sources so that there are two in-line arrays and two cross-line arrays for both the X-X and Y-Y dipole sources. Other embodiments may include more or less sensors and co-planar rings.

As an example operation, receivers in co-planar rings 150a-150d, allow determination of the arrival times and velocities of acoustic signals traveling in the borehole, in the formation, and along the formation walls. Waves generated by source section 120 first arrive at receiver ring 150a and then the same waveform arrives at receiver ring 150b after a time t, where t is the time needed for the waveform to travel from receiver ring 150a to receiver ring 150b. Since the distance between each of the receiver rings 150a-150d is known, the velocity of the waveform in the formation $V_f$ and along the borehole walls $V_b$ can be determined by using timing information.

Figure 6:
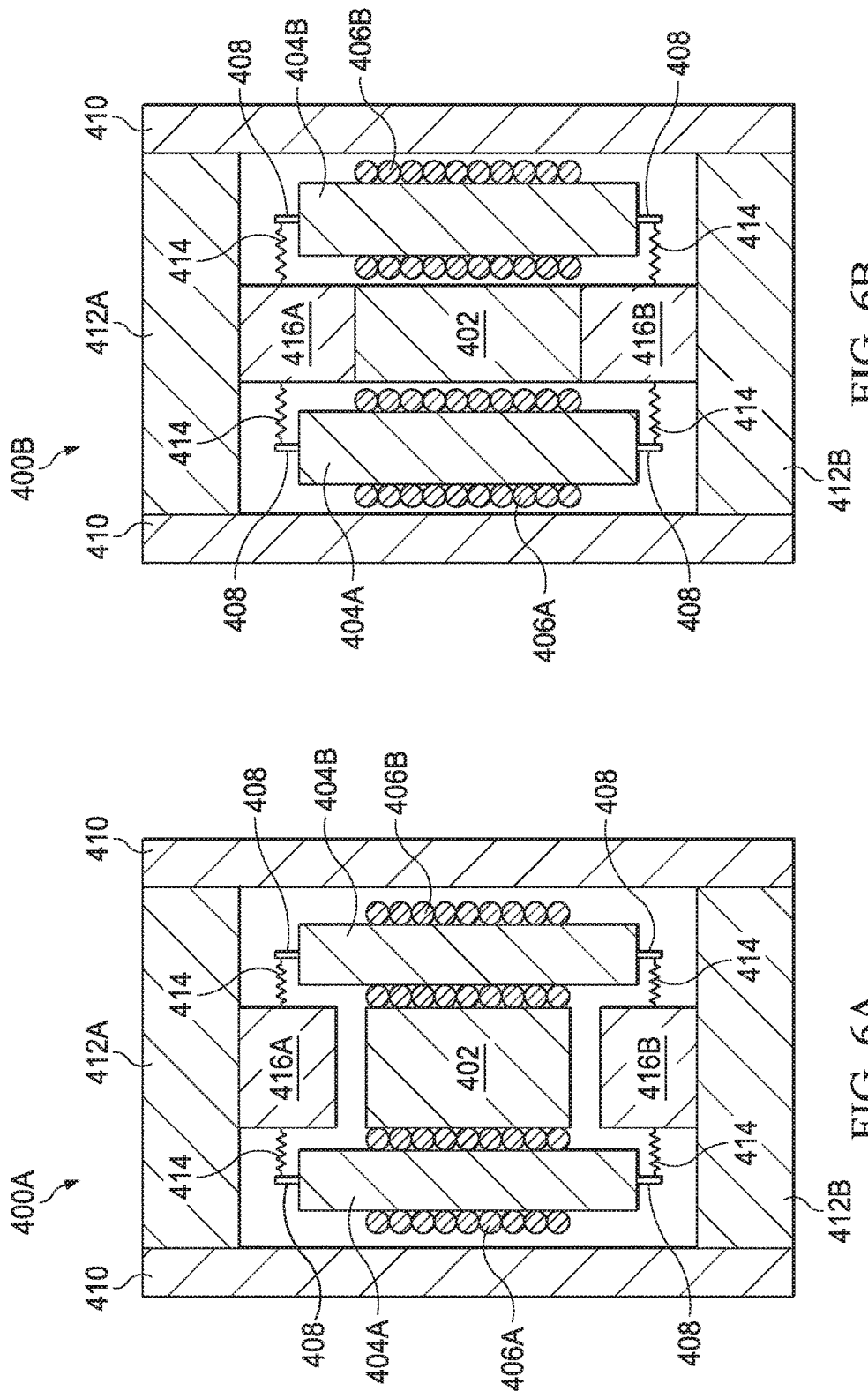
FIG. 6A is a schematic cross-section of first illustrative dipole acoustic transmitter configuration.
FIG. 6B is a schematic cross-section of a second illustrative dipole acoustic transmitter configuration.

FIG. 6A shows a cross-section of a first illustrative dipole acoustic transmitter configuration 400A. As shown, the dipole acoustic transmitter configuration 400A employs a combination of various components as a reaction mass for driving the vibration. The illustrated reaction mass include a permanent magnet 402, a first side laminate 404A wrapped with coil 406A, and a second side laminate 404B wrapped with coil 406B. The dipole acoustic transmitter configuration 400A also employs various components to form the driven or "action" mass. The illustrated action mass includes an outer cylindrical shell or housing 410, end caps 412A and 412B, and end laminates 416A and 416B. The action mass components are bonded together so that they move together or uniformly. Likewise, the reaction mass components may be bonded together so that they move together or uniformly. Such bonding could be achieved by mechanical fastening, glue, or epoxy. In some embodiments, the housing 410 comprises titanium or another lightweight material to improve the output. The illustrated dipole acoustic transmitter configuration 400A employs springs 414 that are attached between the action mass and the reaction mass. Though the spring position may vary, the illustrated configuration 400A connects the springs 414 between the side laminates 404A and 404B and end laminates 416A and 416B. Posts 408 or another adjustable alignment mechanism may extend from side laminates 404A and 404B to facilitate connecting springs and/or to help ensure a symmetric and compliant dipole motion.

The side laminates 404A and 404B are ferritic material that provides a high-permeability path (with high magnetic saturation) for magnetic flux that extends from the north pole of magnet 402 and returns to the south pole of magnet 402. End laminates 416A and 416B provide moveable bridges between the side laminates and the poles of the magnet. The illustrated configuration drives the coils 406A and 406B in a manner that causes the magnetic flux to switch alternately from one side laminate to the other and back again. The flux creates an attractive force across the gap between the bridges (end laminates 416) and the currently-selected side laminate, drawing the bridges (and the rest of the attached action mass) towards that side of the reaction mass. By appropriately switching the flux, the action mass is driven in a vibratory dipole motion.

FIG. 6B shows a cross-section of another illustrative dipole acoustic transmitter configuration 400B. By making the magnet 402 part of the action mass rather than part of the reaction mass, this second configuration 400B eliminates the gaps between the poles of magnet 402 and the end laminates 416. This loss in reaction mass is a tradeoff for the increased magnetic flux (and hence increased force) that is achieved by eliminating the pole gaps. Further, bonding the magnet 402 and end laminates 416 together creates an additional vibratory motion that can be tuned for a high frequency. In other words, the magnet 402 and the end laminates 416 may be packaged together in a manner that represents a second spring system between action mass and reaction mass components. Where sufficient force is readily available, the configuration of FIG. 6A may be preferred to minimize motion of the reaction mass.

Figure 7:
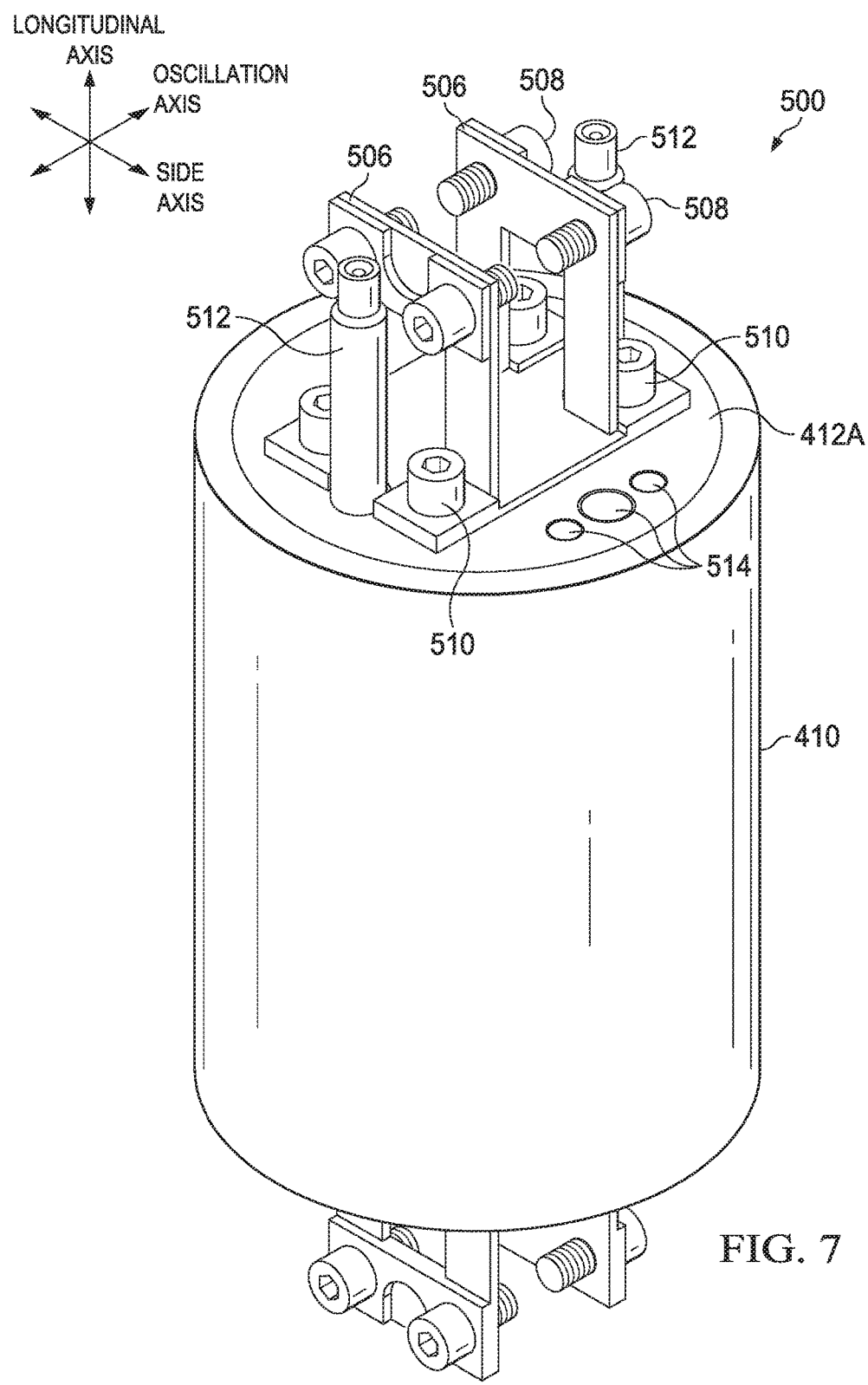
FIG. 7 is a perspective view of an illustrative dipole acoustic transmitter embodiment.
Figure 8:
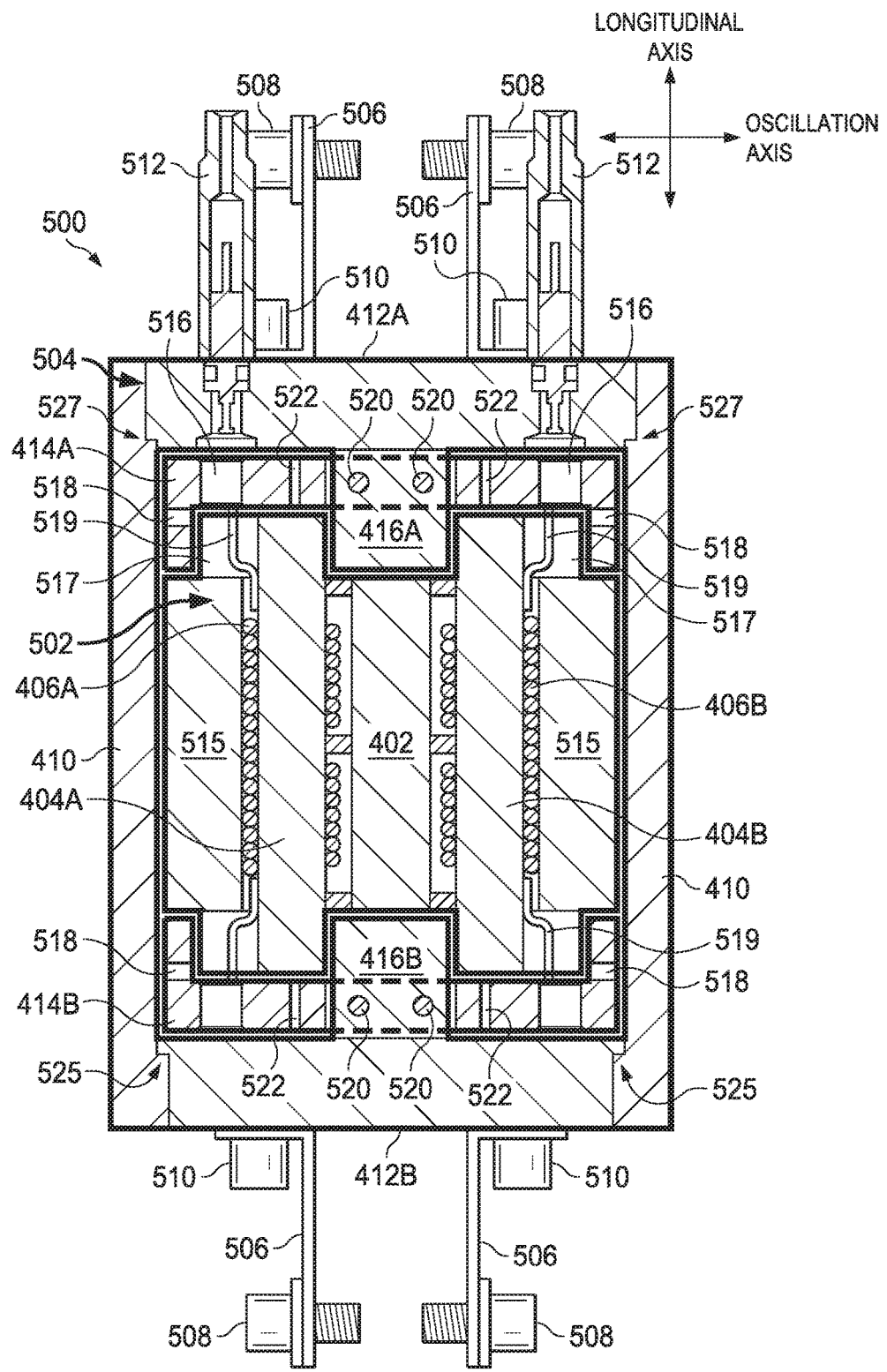
FIG. 8 shows a corresponding cross-section of the illustrative dipole acoustic transmitter embodiment.

FIG. 7 shows a perspective view of an illustrative embodiment of a high-performance dipole acoustic transmitter 500. FIG. 8 also shows mutually orthogonal axes to facilitate describing the transmitter 500, the axes being referred to herein as a longitudinal axis (which is parallel to the tool body), an oscillation axis (which is parallel to the movement of the action mass), and a side axis (which is perpendicular to the other two axes).

Dipole transmitter 500 comprises an outer cylindrical shell 410 that houses electromagnetic actuator components and reaction mass components. The top end of the dipole transmitter 500 is sealed by an end cap 412A that is at least partially inserted into the cylindrical shell 410 and aligns with an inner surface of the shell 410. An adhesive, welding, or other sealant can be used to seal any gaps between end cap 412A and the inner surface of the shell 410. The end cap 412A is also fastened to internal components (e.g., a spring component) of dipole acoustic transmitter 500 using mounting points 514.

In at least some embodiments, the dipole transmitter 500 includes leaf springs 506 attached to the end cap 412A using screws 510 or other fasteners. The leaf springs 506 enable the dipole acoustic transmitter 500 to be longitudinally mounted to a tool (e.g., tool 28 or 100) using screws 508 or other fasteners while still permitting compliant dipole motion. Further, the leaf springs 506 isolate the movement of the dipole acoustic transmitter 500 from the tool body (e.g., of tool 100). To enable high-purity compliant dipole motion along the oscillation axis, the leaf springs 506 have mirror symmetry with respect to a plane that includes the side axis and the longitudinal axis, mirror symmetry with respect to a plane that includes the longitudinal axis and the oscillation axis, and mirror symmetry with respect to a plane that includes the side axis and the oscillation axis.

The dipole acoustic transmitter 500 also includes conduits 512 for conveyance of electrical conductors to supply current to the coils of the dipole transmitter 500. The bottom side of dipole acoustic transmitter 500 includes the same or similar components as the top side, although conduits 512 may only be needed on one side in some embodiments.

FIG. 8 shows an illustrated embodiment of the dipole acoustic transmitter 500 along a plane that includes the longitudinal axis and the oscillation axis. In FIG. 8, various components discussed for FIG. 8 are visible including cylindrical shell 410, end cap 412A, leaf springs 506, screws 508, 510, and conduits 512. Note that dipole acoustic transmitter 500 includes leaf springs 506, and screws 508, 510 on both the top and bottom sides.

The dipole acoustic transmitter 500 includes various components within the housing formed by cylindrical shell 410 and the end caps 412A and 412B (together shell 410 and end caps 412A, 412B form an outer shell or pressure housing), which are part of the action mass 504. End laminates 416A and 4169 are also part of the action mass 504 for dipole acoustic transmitter 500.

The reaction mass 502 for dipole acoustic transmitter 500 is formed by various internal components including permanent magnet 402, side laminate 404A wrapped with coil 406A, and side laminate 404B wrapped with coil 406B. Tungsten masses 515 and tungsten rings 517 are rigidly bonded (e.g., using epoxy) to adjacent components of the reaction mass 502 (e.g., side laminate 404A wrapped with coil 406A, and side laminate 4049 wrapped with coil 406B) and form part of the reaction mass 502 as well.

To operate the dipole acoustic transmitter 500, current is conveyed via conductors 519 to the coils 406A and 406B. Such conductors 519 extend through conduits 512 and conduit holes 516 in springs 414A or 414B to connect coils 406A, 406B to a power supply capable of providing suitable pulses to drive the dipole acoustic transmitter 500 as described herein.

Figure 9A:
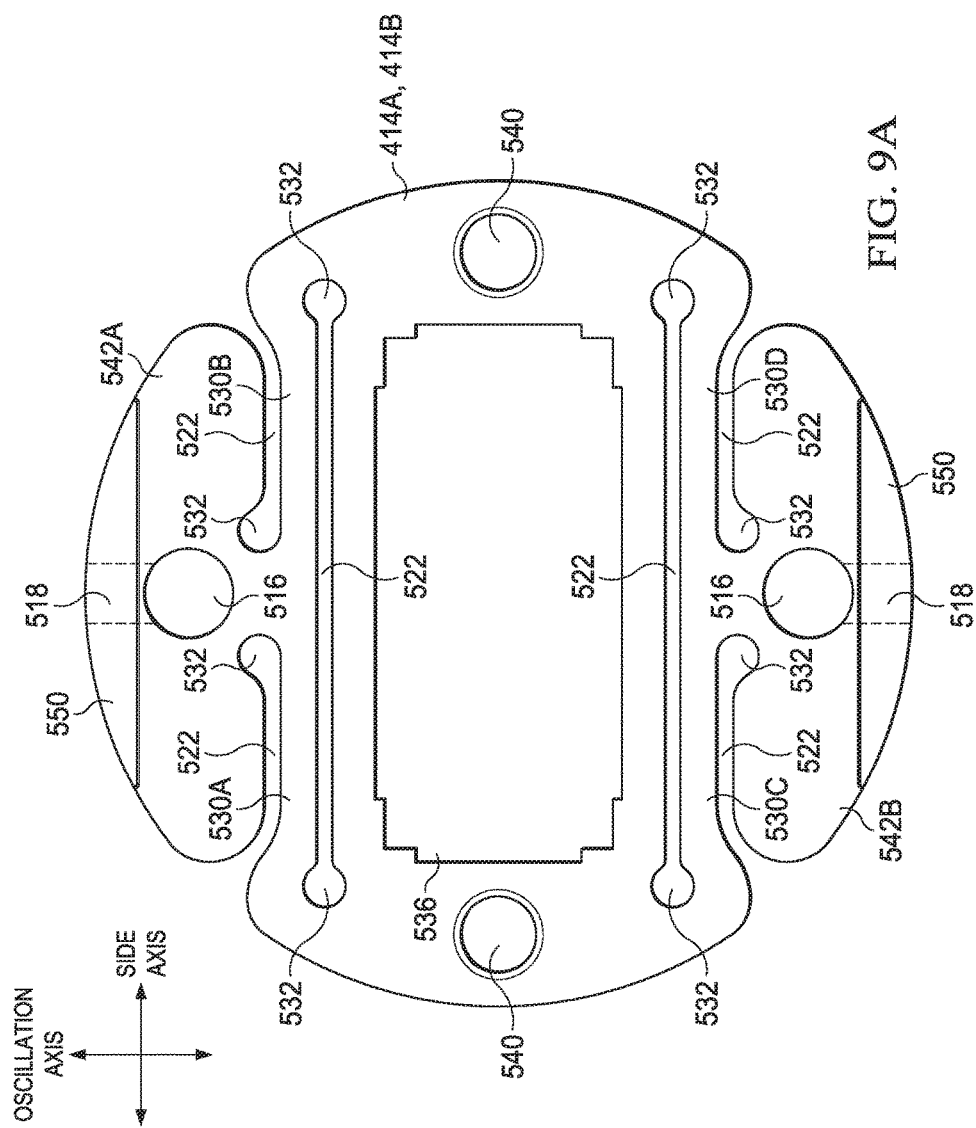
Figure 9B:
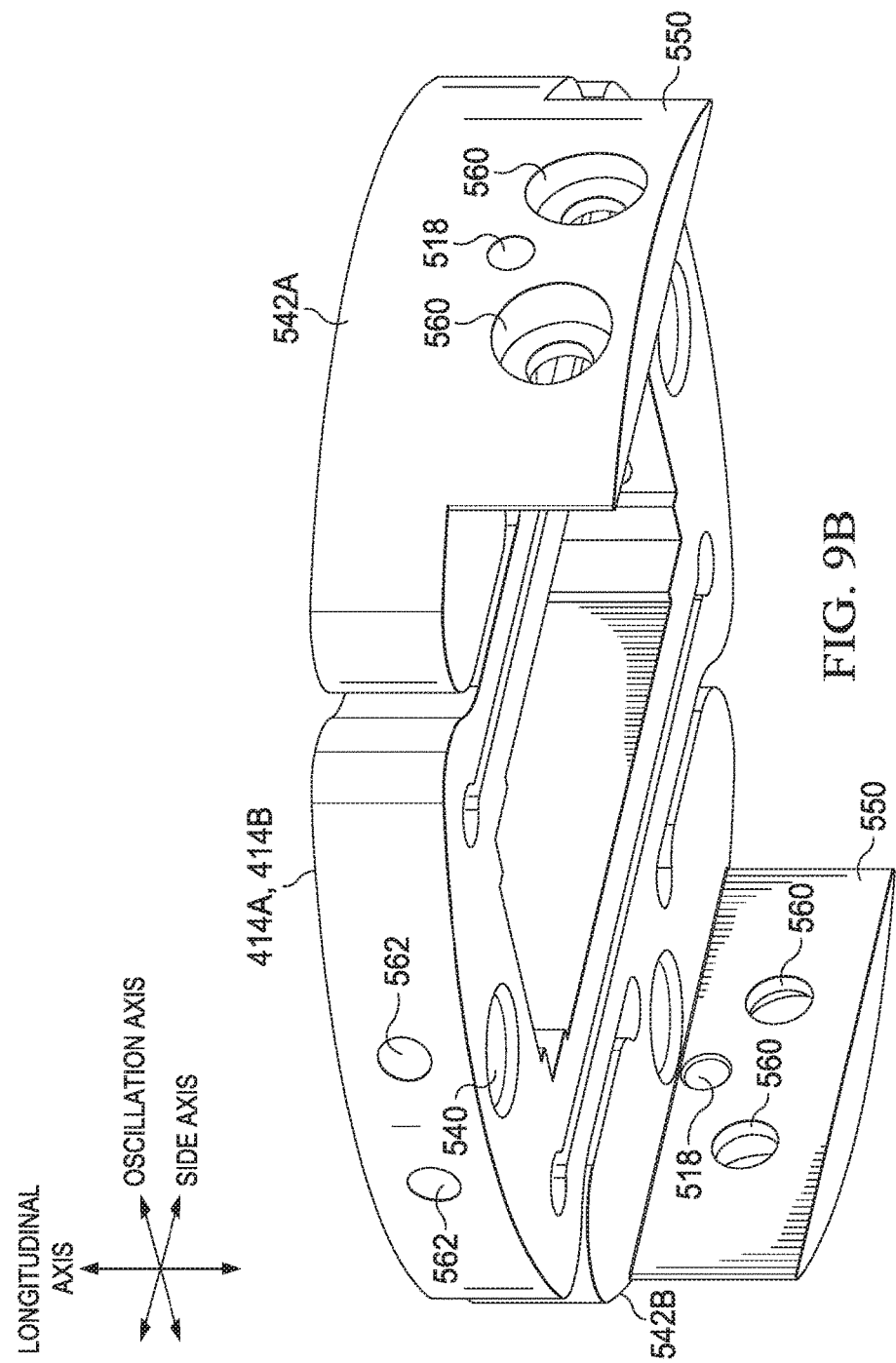

The springs 414A and 414B for dipole acoustic transmitter 500 are separated along the longitudinal axis and connect the action mass 504 and reaction mass 502 together to enable compliant dipole motion. FIGS. 9A-9C show views of a spring embodiment for springs 414A and 414B. In FIG. 9A, a topside view of spring 414A, 414B is shown. More specifically, the spring 414A, 414B comprises a beam arrangement with beams 530A-530D, where each of the beams 530A-530D extends lengthwise in a direction parallel to the side axis and is thinnest in a direction parallel to the oscillation axis (i.e., the thickness of each of the beams 530A-530D in a direction parallel to the oscillation axis is less than the thickness of each of the beams 530A-530D in a direction parallel to the longitudinal axis). The beams 530A-530D are formed, for example, by drilling pilot holes 532 and cutting along lines 522 in the spring material. In other embodiments, sterolithography is employed to form springs 414A, 414B. Without limitation, each spring 414A, 414B is made from a single piece of steel or other strong material that flexes without breaking, where the spring characteristics determine the fundamental resonant frequency of the dipole acoustic transmitter. In some embodiments, carbon fiber springs may be employed.

It at least some embodiments, beams 530A and 530B could be a single beam as shown, with a mid-beam anchor 542A attached thereto. Similarly, beams 530C and 530D could be a single beam with a mid-beam anchor 542B attached thereto. Each of the mid-beam anchors 542A and 542B includes a conduit hole 516 to pass through conductors 519 for coils 406A and 406B. Further, each mid-beam anchor 542A and 542B includes a lip 550 with mounting points 518 and 560 as shown in FIG. 9B. Also shown in FIG. 9B are holes 562 to enable bolts 566 or other fasteners to connect one of springs 414A, 414B to one of the end laminates 416A, 416B, which has holes 520 for this purpose (see FIGS. 8 and 9C). Once assembled, the end laminate 416A fits at least partially in space 536 of spring 414A and is fastened thereto using bolts 566 or other fasteners. Similarly, the end laminate 416B fits at least partially in space 536 of spring 414B and is fastened thereto using bolts 566 or other fasteners.

As shown in FIG. 9C, bolts 563 or other fasteners may be inserted through mounting points 560 in each lip 550 to connect each spring 414A, 414B to a tungsten ring 517. Further, a washer or other adjustment mechanism may be employed to enable adjustments of gaps between action mass components (e.g., end laminates 416A and 416B) and reaction mass components (e.g., side laminates 404A and 404B) of dipole transmitter 500. In at least some embodiments, the spring 414A attaches to end cap 412A using mounting points 540 that align with at least one of the mounting points 514 in end cap 412A (see FIG. 7). Likewise, the spring 414B can attach to end cap 412B using similar mounting points.

In different embodiments, the spring 414A, 4143 may vary. For example, the location of mounting points 540 may vary. Further, the size and location of pilot holes 532 and lines 522 may vary. Further, separate anchors may be used for each of the beams 530A-530D. Further, the size and shape of anchors 542A, 542B, and corresponding lips 550 may vary.

Figure 10:
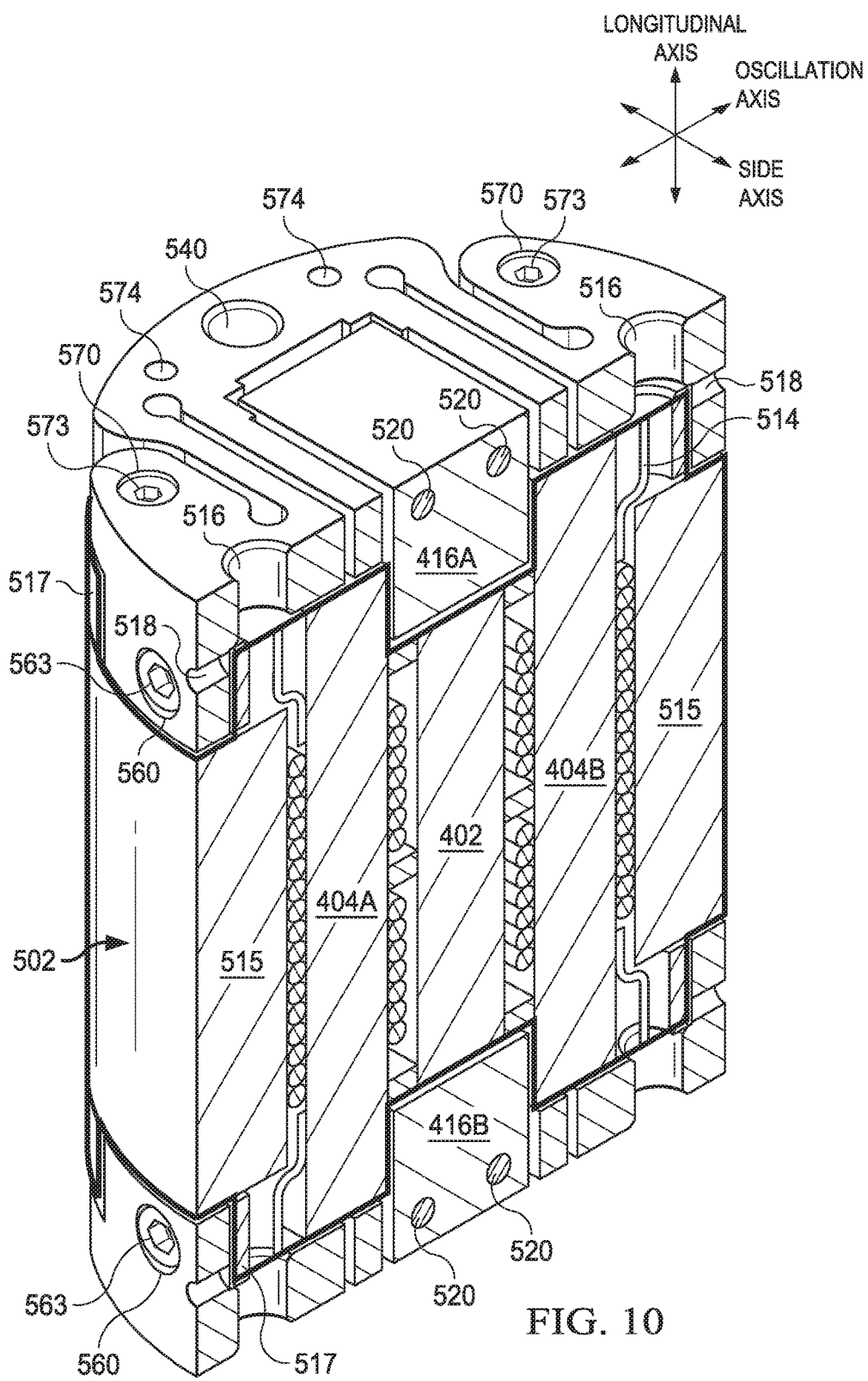
FIG. 10 is a cut-away partial perspective view for the illustrative dipole acoustic transmitter embodiment.

FIG. 10 shows a perspective cross-sectional view for some of the dipole transmitter 500. In FIG. 10, the shell 410 and the end caps 412A and 412B are omitted to facilitate viewing internal components. In at least some embodiments, curved pieces of tungsten mass 515 are bonded together and wrap around the other internal components such as permanent magnet 402, side laminates 404A, 404B, and coils 406A, 406B. More specifically, four or more pieces of tungsten mass 515 may be rigidly connected together (e.g., using epoxy) to form an outer part of the reaction mass 502. Regardless of the number of pieces, the tungsten mass 515 can also be rigidly connected to the tungsten rings 517 as well as the other reaction mass components such as permanent magnet 402, side laminates 404A, 404B, and coils 406A, 406B. FIG. 10 also shows additional mounting points 570, 574 and fasteners 573.

To summarize, the disclosed high-purity dipole transmitters have a longitudinal axis, an oscillation axis, and a side axis, each of said axes being mutually orthogonal. In at least some embodiments, the disclosed transmitters may include an outer shell having external surfaces for displacing fluid along the oscillation axis. Further, the disclosed transmitters may include a reaction mass (e.g., reaction mass 502) positioned inside the outer shell. Further, the disclosed transmitters may include an electromagnetic actuator that drives the outer shell relative to the reaction mass. Further the disclosed transmitters may include a pair of matching springs (e.g. springs 414A and 414B) separated along the longitudinal axis, where each spring is coupled between the outer shell and the reaction mass to enable compliant dipole motion of the outer shell along the oscillation axis while suppressing motion along other axes. In at least some embodiments, each spring includes a beam arrangement with each beam extending lengthwise in a direction parallel to the side axis and being thinnest in a direction parallel to the oscillation axis. Further, the outer shell, the reaction mass, the electromagnetic actuator, and each spring, may each have mirror symmetry in a plane that includes the oscillation axis and the longitudinal axis, mirror symmetry in a plane that includes the side axis and the longitudinal axis, and mirror symmetry in a plane that includes the oscillation axis and the side axis.

In at least some embodiments, the beam arrangement includes two pairs of beams, the beams of each pair extending in opposite directions along the side axis from a mid-beam anchor. Further beam pairs may be spaced apart along the oscillation axis and have distal ends of the beam pairs connected by a rigid frame. Without limitation, each spring may include a first set of mounting points on the mid-beam anchors and a second set of mounting points on the rigid frame. In such embodiments, the reaction mass is mounted to the first set of mounting points in a direction parallel to the oscillation axis and the outer shell is mounted to the second set of mounting points in a direction parallel to the longitudinal axis. Further, each spring may include a gap to receive at least part of an end laminate. Further, each spring and each end laminate may include multiple bolt holes for attachment together in twist resistant arrangement.

In at least some embodiments, the reaction mass of the disclosed transmitters includes tungsten masses. For example, the first set of mounting points may attach a given spring to the tungsten masses. Without limitation, the first set of mounting points may be located on mirrored lips extending from the mid-beam anchors.

In accordance with at least some embodiments, the disclosed dipole acoustic transmitter is driven by an electromagnetic actuator. Such an electromagnetic actuator may include a magnetic circuit having alternative gaps between one or more components attached to the outer shell and one or more components associated with the reaction mass. The electromagnetic actuator drives the dipole motion by switching magnetic flux between the alternative gaps. As an example, the alternative gaps are between side laminates associated with the reaction mass, and end laminates associated with an action mass that includes the outer shell. Further, the alternative gaps may be adjustable in a direction parallel to the oscillation axis using a first set of mounting points on each spring that attaches the spring to the reaction mass.

In one embodiment, a permanent magnet associated with the electromagnetic actuator is attached to the outer shell and is part of the action mass. In another embodiment, a permanent magnet associated with the electromagnetic actuator is part of the reaction mass. Without limitation, the outer shell for a dipole acoustic transmitter includes a cylindrical shell and end caps. Each end cap is attached, for example to one of the matching springs.

Figure 11:
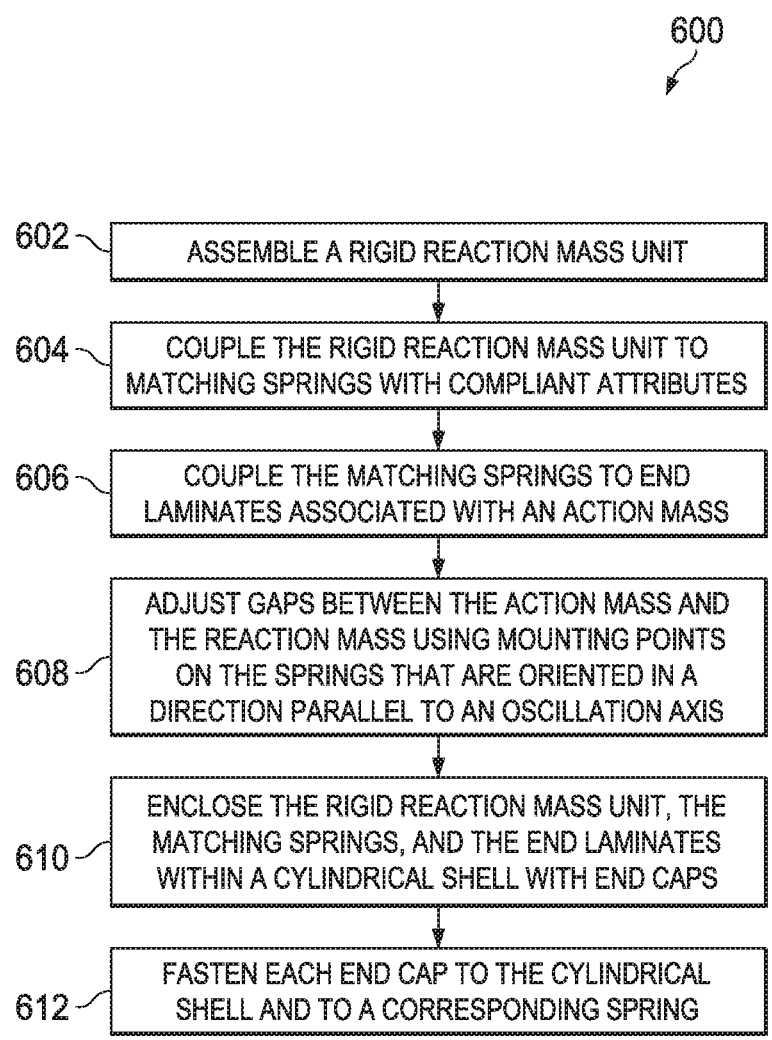
FIG. 11 is a flowchart of an illustrative dipole acoustic transmitter assembly method.

FIG. 11 shows a flowchart of an illustrative dipole acoustic transmitter assembly method 600. It should be understood that the method 600 may vary and may, for example, include more or less steps. As shown, the method 600 comprises assembling a rigid reaction mass unit. In at least some embodiments, the rigid reaction mass unit includes a permanent magnet, side laminates, coils, and tungsten masses as described herein. At block 604, the rigid reaction mass unit is coupled to matching springs with compliant attributes. In an example embodiment, a spring with compliant attributes includes a beam arrangement with each beam extending lengthwise in a direction parallel to the side axis and being thinnest in a direction parallel to the oscillation axis to enable compliant dipole motion of the action mass along the oscillation axis while suppressing motion along other axes. Further, the spring (as well as the action mass and reaction mass) may have mirror symmetry in a plane that includes the oscillation axis and the longitudinal axis, and mirror symmetry in a plane that includes the side axis and the longitudinal axis. At block 606, the matching springs are coupled to end laminates associated with an action mass. At block 608, gaps between the action mass and the reaction mass are adjusted using mounting points on the springs that are oriented in a direction parallel to the oscillation axis. For example, such gaps may be adjusted by measuring and adjusting the gap between at least one side laminate and at least one end laminate. After the gap adjustments are made, the rigid reaction mass unit, the matching springs, and the end laminates are enclosed within a cylindrical shell with end caps at block 610. Further, each end cap is fastened to the cylindrical shell and to a corresponding spring at block 612. Other steps may be included and/or steps may be omitted in different embodiments. Further, the ordering steps may vary in different embodiments.

An example assembly of dipole transmitter 500 will now be provided. To assemble dipole transmitter 500, the end cap 412B is inserted into the top side of an empty cylindrical shell 410 until the end cap 412B contacts a side of the shell at points 525 (see FIG. 8). The various reaction mass components, the springs 414A, 414B, and the end laminates 416A, 416B can be assembled and adjusted prior to their insertion into shell 410. In particular, the gaps between end laminates 416A, 416B and side laminates 404A, 414B need to be precisely controlled and adjusted as needed. Once the gaps are compliant, the internal components are placed as a unit into the shell 410 such that mounting points 540 and/or conduit holes 516 of the spring 414B align with corresponding mounting points (e.g., mounting points 514) or holes of the end cap 412B. With the internal components inside the cylindrical shell 410, end cap 412A is put into its place by alignment of mounting points 540 and/or conduit holes 516 of the spring 414A with corresponding mounting points (e.g., mounting points 514) or holes of the end cap 412A. The wires or conductors 519 attached to the internal components may be conveyed through conduit holes 516 in springs 414A, 414B, and conduits 512 during the assembly process. The end cap 412A may then be fastened to spring 414A and to end laminate 416A as described herein.

Before or after end cap 412A is fastened to the spring 414A and to end laminate 416A, the end cap 412B may similarly be fastened to spring 414B and to end laminate 416B. Further, the leaf springs 406 may be attached to end caps 412A, 412B using screws 510 before or after the end caps 412A, 412B are put in place. Once dipole transmitter 500 is thus assembled it may be attached to a tool (e.g., tool 28 or 100) using screws 508 or other fasteners. In at least some embodiments, two dipole transmitters 500 are separately fastened along a longitudinal axis to a tool and at different orientations (e.g., a 90 degree azimuthal offset) to provide robust acoustic source signal options. Additional dipole transmitters 500 and smaller azimuthal offsets are possible as well.

With the assembled dipole acoustic transmitter mounted to a logging tool, logging operations may be performed. For example, a broadband pulse may be provided to drive a dipole acoustic transmitter. Further, a formation response to an output of a dipole acoustic transmitter is collected. The formation response is stored for display or analysis.

Embodiments disclosed herein include:

A: A high-purity dipole transmitter with a longitudinal axis, an oscillation axis, and a side axis, each of said axes being mutually orthogonal, the transmitter comprises an outer shell having external surfaces for displacing fluid along the oscillation axis, a reaction mass positioned inside the outer shell, an electromagnetic actuator that drives the outer shell relative to the reaction mass, and a pair of matching springs separated along the longitudinal axis, each spring coupled between the outer shell and the reaction mass to enable compliant dipole motion of the outer shell along the oscillation axis while suppressing motion along other axes. Each spring comprises a beam arrangement with each beam extending lengthwise in a direction parallel to the side axis and being thinnest in a direction parallel to the oscillation axis, and wherein each of the outer shell, the reaction mass, the electromagnetic actuator, and each spring, has mirror symmetry in a plane that includes the oscillation axis and the longitudinal axis, and mirror symmetry in a plane that includes the side axis and the longitudinal axis.

B: A logging tool that comprises a dipole transmitter, a plurality of acoustic receivers, and electronics for controlling acoustic logging operations using the dipole transmitter and the plurality of acoustic receivers. The dipole transmitter has a longitudinal axis, an oscillation axis, and a side axis, each of said axes being mutually orthogonal. The dipole transmitter comprises a pair of matching springs separated along the longitudinal axis, each spring coupled between an action mass and a reaction mass to enable compliant dipole motion of the action mass along the oscillation axis while suppressing motion along other axes. Each spring comprises a beam arrangement with each beam extending lengthwise in a direction parallel to the side axis and being thinnest in a direction parallel to the oscillation axis. Each of the action mass, the reaction mass, and each spring, has mirror symmetry in a plane that includes the oscillation axis and the longitudinal axis, and mirror symmetry in a plane that includes the side axis and the longitudinal axis, a plurality of acoustic receivers, and electronics for controlling acoustic logging operations using the dipole transmitter and the plurality of acoustic receivers.

C: A method for assembling a high-purity dipole transmitter having a longitudinal axis, an oscillation axis, and a side axis, each of said axes being mutually orthogonal, the method comprises coupling an action mass to a reaction mass for the transmitter using a pair of matching springs separated along the longitudinal axis, and adjusting gaps between the action mass and the reaction mass using mounting points on the matching springs that are oriented in a direction parallel to the oscillation axis. Each spring comprises a beam arrangement with each beam extending lengthwise in a direction parallel to the side axis and being thinnest in a direction parallel to the oscillation axis to enable compliant dipole motion of the action mass along the oscillation axis while suppressing motion along other axes. Each of the action mass, the reaction mass, and each spring, has mirror symmetry in a plane that includes the oscillation axis and the longitudinal axis, and mirror symmetry in a plane that includes the side axis and the longitudinal axis.

D: A system that comprises a plurality of acoustic receivers, a dipole transmitter, and electronics for controlling acoustic logging operations using the dipole transmitter and the plurality of acoustic receivers. The dipole transmitter has a longitudinal axis, an oscillation axis, and a side axis, each of said axes being mutually orthogonal. The dipole transmitter comprises a pair of matching springs separated along the longitudinal axis, each spring coupled between an action mass and a reaction mass to enable compliant dipole motion of the action mass along the oscillation axis while suppressing motion along other axes. Each spring comprises a beam arrangement with each beam extending lengthwise in a direction parallel to the side axis and being thinnest in a direction parallel to the oscillation axis. Each of the action mass, the reaction mass, and each spring, has mirror symmetry in a plane that includes the oscillation axis and the longitudinal axis, and mirror symmetry in a plane that includes the side axis and the longitudinal axis.

E: A method that comprises emitting an acoustic signal from a dipole transmitter, detecting a formation response to the emitted acoustic signal by a plurality of acoustic receivers, and displaying or storing the formation response. The dipole transmitter has a longitudinal axis, an oscillation axis, and a side axis, each of said axes being mutually orthogonal. The dipole transmitter comprises a pair of matching springs separated along the longitudinal axis, each spring coupled between an action mass and a reaction mass to enable compliant dipole motion of the action mass along the oscillation axis while suppressing motion along other axes. Each spring comprises a beam arrangement with each beam extending lengthwise in a direction parallel to the side axis and being thinnest in a direction parallel to the oscillation axis. Each of the action mass, the reaction mass, and each spring, has mirror symmetry in a plane that includes the oscillation axis and the longitudinal axis, and mirror symmetry in a plane that includes the side axis and the longitudinal axis.

Each of the embodiments, A, B, C, D, and E may have one or more of the following additional elements in any combination. Element 1: the beam arrangement comprises two pairs of beams, the beams of each pair extending in opposite directions along the side axis from a mid-beam anchor, said pairs being spaced apart along the oscillation axis and having distal ends of the beam pairs connected by a rigid frame. Element 2: each spring includes a first set of mounting points on the mid-beam anchors and a second set of mounting points on the rigid frame. Element 3: the reaction mass is mounted to the first set of mounting points in a direction parallel to the oscillation axis and wherein the outer shell is mounted to the second set of mounting points in a direction parallel to the longitudinal axis. Element 4: the reaction mass includes tungsten masses and wherein the first set of mounting points attaches the spring to the tungsten masses. Element 5: the first set of mounting points are located on mirrored lips extending from the mid-beam anchors. Element 6: the electromagnetic actuator comprises a magnetic circuit having alternative gaps between one or more components attached to the outer shell and one or more components associated with the reaction mass, wherein the actuator drives the dipole motion by switching magnetic flux between the alternative gaps. Element 7: the alternative gaps are between side laminates associated with the reaction mass and end laminates associated with an action mass that includes the outer shell. Element 8: the alternative gaps are adjustable in a direction parallel to the oscillation axis using a first set of mounting points on each spring that attaches the spring to the reaction mass. Element 9: the electromagnetic actuator comprises an electromagnet attached to the outer shell. Element 10: the electromagnetic actuator comprises an electromagnet attached to the reaction mass. Element 11: the outer shell is cylindrical having end caps, each end cap being attached to one of said matching springs. Element 12: each spring includes a gap to receive at least part of an end laminate, and wherein each spring and each end laminate includes multiple bolt holes for attachment together in twist resistant arrangement. Element 13: the outer shell comprises titanium.

Element 14: the reaction mass comprises a permanent magnet, tungsten rings, and curved tungsten plates. Element 15: the action mass includes a permanent magnet, end laminates, end caps, and a cylindrical tube.

Element 16: further comprising: assembling a rigid reaction mass unit, coupling the rigid reaction mass unit to the matching springs, and coupling the matching springs to end laminates associated with the action mass. Element 17: The rigid reaction mass unit comprises a permanent magnet, side laminates with coils, and tungsten masses. Element 18: adjusting gaps comprises measuring and adjusting a gap between at least one side laminate and at least one end laminate. Element 19: after said adjusting, enclosing the rigid reaction mass unit, the matching springs, and the end laminates within a cylindrical shell with end caps.

Element 20: the plurality of acoustic receivers are positioned at or near earth's surface and the dipole transmitter is positioned in a borehole. Element 21: the plurality of acoustic receivers are positioned in a first borehole and the dipole transmitter is positioned in a second borehole. Element 22: the plurality of acoustic receivers or the dipole transmitter are components of a logging-while-drilling (LWD) tool. Element 23: the plurality of acoustic receivers or the dipole transmitter are components of a wireline logging tool. Element 24: the plurality of acoustic receivers or the dipole transmitter are components of permanent well installation.

Element 25: further comprising positioning the plurality of acoustic receivers at or near earth's surface and positioning the dipole transmitter in a borehole. Element 26: further comprising positioning the plurality of acoustic receivers in a first borehole and positioning the dipole transmitter in a second borehole. Element 27: further comprising positioning the plurality of acoustic receivers or the dipole transmitter in a downhole location via logging-while-drilling (LWD) operations. Element 28: further comprising positioning the plurality of acoustic receivers or the dipole transmitter in a downhole location via wireline logging operations. Element 29: further comprising positioning the plurality of acoustic receivers or the dipole transmitter in a downhole location via permanent well installation operations.

Numerous other modifications, equivalents, and alternatives, will become apparent to those skilled in the art once the above disclosure is fully appreciated. It is intended that the following claims be interpreted to embrace all such modifications, equivalents, and alternatives where applicable.

What is claimed is:

1. A high-purity dipole transmitter with a longitudinal axis, an oscillation axis, and a side axis, each of said axes being mutually orthogonal, the transmitter comprising:
    an outer shell having external surfaces for displacing fluid along the oscillation axis;
    a reaction mass positioned inside the outer shell;
    an electromagnetic actuator that drives the outer shell relative to the reaction mass; and
    a pair of matching springs separated along the longitudinal axis, each spring coupled between the outer shell and the reaction mass to enable compliant dipole motion of the outer shell along the oscillation axis while suppressing motion along other axes,
    wherein each spring comprises a beam arrangement with each beam extending lengthwise in a direction parallel to the side axis and being thinnest in a direction parallel to the oscillation axis, and
    wherein each of the outer shell, the reaction mass, the electromagnetic actuator, and each spring, has mirror symmetry in a plane that includes the oscillation axis and the longitudinal axis, and mirror symmetry in a plane that includes the side axis and the longitudinal axis.

2. The transmitter of claim 1, wherein the beam arrangement comprises two pairs of beams, the beams of each pair extending in opposite directions along the side axis from a mid-beam anchor, said pairs being spaced apart along the oscillation axis and having distal ends of the beam pairs connected by a rigid frame.

3. The transmitter of claim 2, wherein each spring includes a first set of mounting points on the mid-beam anchors and a second set of mounting points on the rigid frame.

4. The transmitter of claim 3, wherein the reaction mass is mounted to the first set of mounting points in a direction parallel to the oscillation axis and wherein the outer shell is mounted to the second set of mounting points in a direction parallel to the longitudinal axis.

5. The transmitter of claim 3, wherein the reaction mass includes tungsten masses and wherein the first set of mounting points attaches the spring to the tungsten masses.

6. The transmitter of claim 3, wherein the first set of mounting points are located on mirrored lips extending from the mid-beam anchors.

7. The transmitter of claim 1, wherein the electromagnetic actuator comprises a magnetic circuit having alternative gaps between one or more components attached to the outer shell and one or more components associated with the reaction mass, wherein the actuator drives the dipole motion by switching magnetic flux between the alternative gaps.

8. The transmitter of claim 7, wherein the alternative gaps are between side laminates associated with the reaction mass and end laminates associated with an action mass that includes the outer shell.

9. The transmitter of claim 7, wherein the alternative gaps are adjustable in a direction parallel to the oscillation axis using a first set of mounting points on each spring that attaches the spring to the reaction mass.

10. The transmitter of claim 7, wherein the electromagnetic actuator comprises an electromagnet attached to the outer shell.

11. The transmitter of claim 7, wherein the electromagnetic actuator comprises an electromagnet attached to the reaction mass.

12. The transmitter of claim 1, wherein the outer shell is cylindrical having end caps, each end cap being attached to one of said matching springs.

13. The transmitter of claim 1, wherein each spring includes a gap to receive at least part of an end laminate, and wherein each spring and each end laminate includes multiple bolt holes for attachment together in twist resistant arrangement.

14. The transmitter of claim 1, wherein the outer shell comprises titanium.

15. A logging tool, comprising:
a dipole transmitter with a longitudinal axis, an oscillation axis, and a side axis, each of said axes being mutually orthogonal, the transmitter comprising:
a pair of matching springs separated along the longitudinal axis, each spring coupled between an action mass and a reaction mass to enable compliant dipole motion of the action mass along the oscillation axis while suppressing motion along other axes,
wherein each spring comprises a beam arrangement with each beam extending lengthwise in a direction parallel to the side axis and being thinnest in a direction parallel to the oscillation axis, and
wherein each of the action mass, the reaction mass, and each spring, has mirror symmetry in a plane that includes the oscillation axis and the longitudinal axis, and mirror symmetry in a plane that includes the side axis and the longitudinal axis,
a plurality of acoustic receivers; and
electronics for controlling acoustic logging operations using the dipole transmitter and the plurality of acoustic receivers.

16. The logging tool of claim 15, wherein the reaction mass comprises a permanent magnet, tungsten rings, and curved tungsten plates.

17. The logging tool of claim 15, wherein the action mass includes a permanent magnet, end laminates, end caps, and a cylindrical tube.

18. A method for assembling a high-purity dipole transmitter having a longitudinal axis, an oscillation axis, and a side axis, each of said axes being mutually orthogonal, the method comprising:
coupling an action mass to a reaction mass for the transmitter using a pair of matching springs separated along the longitudinal axis,
wherein each spring comprises a beam arrangement with each beam extending lengthwise in a direction parallel to the side axis and being thinnest in a direction parallel to the oscillation axis to enable compliant dipole motion of the action mass along the oscillation axis while suppressing motion along other axes, and
wherein each of the action mass, the reaction mass, and each spring, has mirror symmetry in a plane that includes the oscillation axis and the longitudinal axis, and mirror symmetry in a plane that includes the side axis and the longitudinal axis,
adjusting gaps between the action mass and the reaction mass using mounting points on the matching springs that are oriented in a direction parallel to the oscillation axis.

19. The method of claim 18, further comprising:
assembling a rigid reaction mass unit, said unit comprising a permanent magnet, side laminates with coils, and tungsten masses;
coupling the rigid reaction mass unit to the matching springs; and
coupling the matching springs to end laminates associated with the action mass,
wherein said adjusting gaps comprises measuring and adjusting a gap between at least one side laminate and at least one end laminate.

20. The method of claim 19, further comprising:
after said adjusting, enclosing the rigid reaction mass unit, the matching springs, and the end laminates within a cylindrical shell with end caps.

21. A system, comprising a plurality of acoustic receivers; and
a dipole transmitter with a longitudinal axis, an oscillation axis, and a side axis, each of said axes being mutually orthogonal, the transmitter comprising:
a pair of matching springs separated along the longitudinal axis, each spring coupled between an action mass and a reaction mass to enable compliant dipole motion of the action mass along the oscillation axis while suppressing motion along other axes,
wherein each spring comprises a beam arrangement with each beam extending lengthwise in a direction parallel to the side axis and being thinnest in a direction parallel to the oscillation axis, and
wherein each of the action mass, the reaction mass, and each spring, has mirror symmetry in a plane that includes the oscillation axis and the longitudinal axis, and mirror symmetry in a plane that includes the side axis and the longitudinal axis; and
electronics for controlling acoustic logging operations using the dipole transmitter and the plurality of acoustic receivers.

22. The system of claim 21, wherein the plurality of acoustic receivers are positioned at or near earth's surface and the dipole transmitter is positioned in a borehole.

23. The system of claim 21, wherein the plurality of acoustic receivers are positioned in a first borehole and the dipole transmitter is positioned in a second borehole.

24. The system of claim 21, wherein the plurality of acoustic receivers or the dipole transmitter are components of a logging-while-drilling (LWD) tool.

25. The system of claim 21, wherein the plurality of acoustic receivers or the dipole transmitter are components of a wireline logging tool.

26. The system of claim 21, wherein the plurality of acoustic receivers or the dipole transmitter are components of permanent well installation.

27. A method, comprising:
emitting an acoustic signal from a dipole transmitter with a longitudinal axis, an oscillation axis, and a side axis, each of said axes being mutually orthogonal, the transmitter comprising:
a pair of matching springs separated along the longitudinal axis, each spring coupled between an action mass and a reaction mass to enable compliant dipole motion of the action mass along the oscillation axis while suppressing motion along other axes,
wherein each spring comprises a beam arrangement with each beam extending lengthwise in a direction parallel to the side axis and being thinnest in a direction parallel to the oscillation axis, and
wherein each of the action mass, the reaction mass, and each spring, has mirror symmetry in a plane that includes the oscillation axis and the longitudinal axis, and mirror symmetry in a plane that includes the side axis and the longitudinal axis;
detecting a formation response to the emitted acoustic signal by a plurality of acoustic receivers; and
displaying or storing the formation response.

28. The method of claim 27, further comprising positioning the plurality of acoustic receivers at or near earth's surface and positioning the dipole transmitter in a borehole.

29. The method of claim 27, further comprising positioning the plurality of acoustic receivers in a first borehole and positioning the dipole transmitter in a second borehole.

30. The method of claim 27, further comprising positioning the plurality of acoustic receivers or the dipole transmitter in a downhole location via logging-while-drilling (LWD) operations.

31. The method of claim 27, further comprising positioning the plurality of acoustic receivers or the dipole transmitter in a downhole location via wireline logging operations.

32. The method of claim 27, further comprising positioning the plurality of acoustic receivers or the dipole transmitter in a downhole location via permanent well installation operations.

* * * * *

UNITED STATES PATENT AND TRADEMARK OFFICE
CERTIFICATE OF CORRECTION

PATENT NO. : 9,952,344 B2
APPLICATION NO. : 15/115636
DATED : April 24, 2018
INVENTOR(S) : Chung Chang et al.

It is certified that error appears in the above-identified patent and that said Letters Patent is hereby corrected as shown below:

In the Specification

In Column 7, Line 39, after --and-- delete "4169" and insert --416B--

In Column 7, Line 48, after --laminate-- delete "4049" and insert --404B--

In Column 8, Line 45, after --414A,-- delete "4143" and insert --414B--

Signed and Sealed this
Thirty-first Day of July, 2018

Andrei Iancu
*Director of the United States Patent and Trademark Office*